Sept. 5, 1933.                F. R. ZUMBRO                1,925,619
           METHOD AND APPARATUS FOR MAKING CARBON DIOXIDE ICE
                    Filed April 28, 1930          2 Sheets-Sheet 1
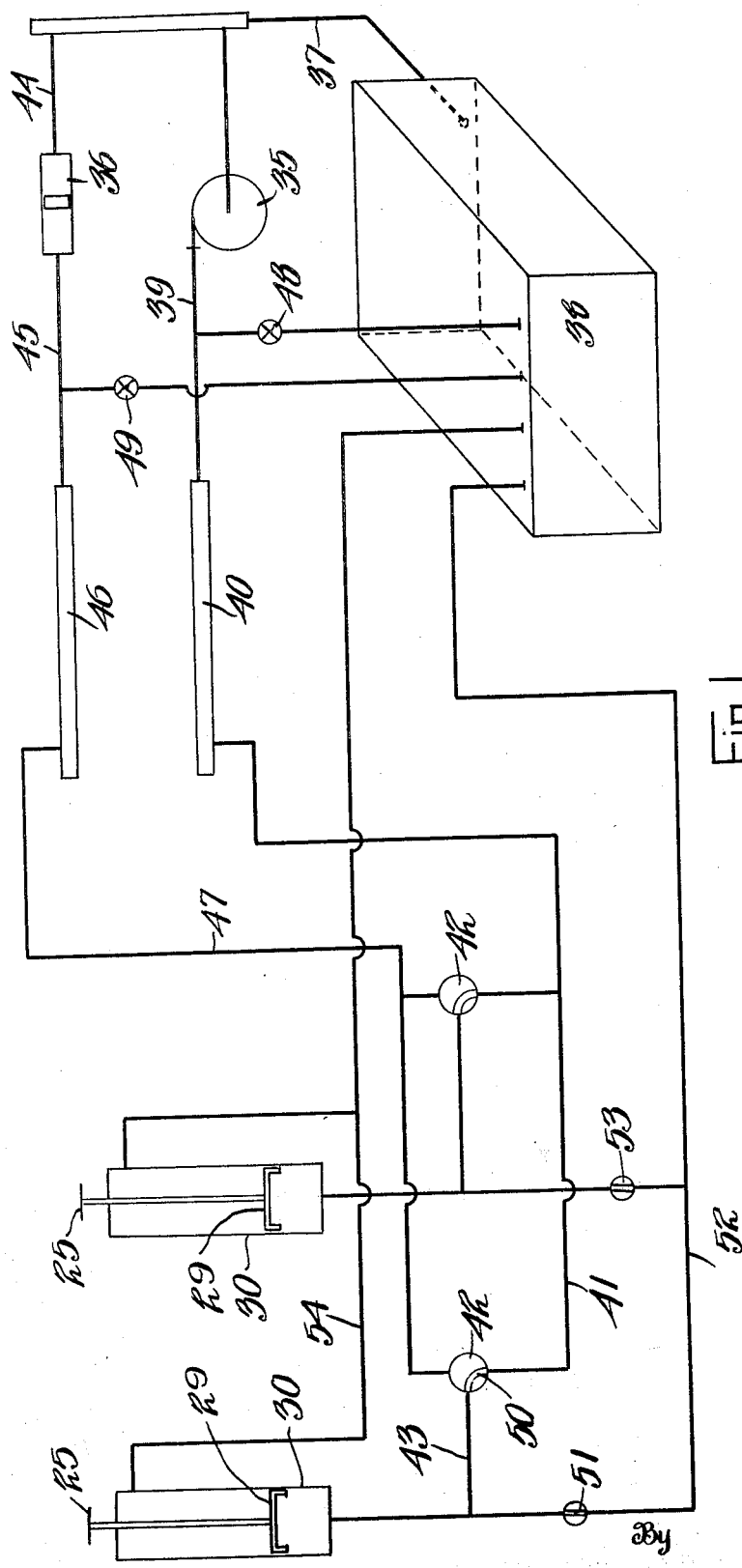

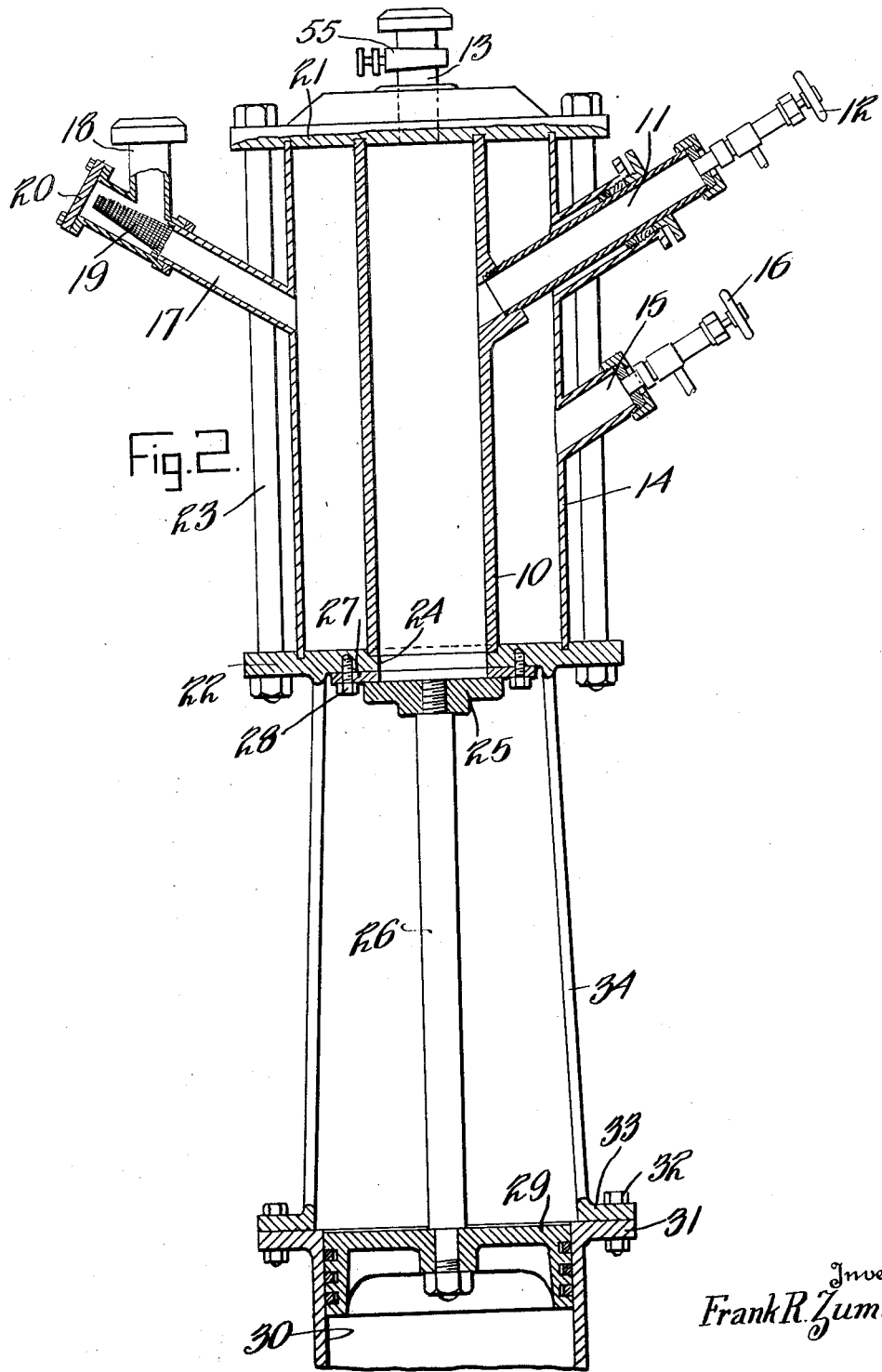

Patented Sept. 5, 1933

1,925,619

UNITED STATES PATENT OFFICE 1,925,619

METHOD AND APPARATUS FOR MAKING CARBON DIOXIDE ICE

Frank R. Zumbro, Waynesboro, Pa., assignor to Frick Company, Waynesboro, Pa., a corporation of Pennsylvania Application April 28, 1930. Serial No. 448,049

6 Claims. (Cl. 62—121)

This invention relates to a method and apparatus for making carbon dioxide ice. Heretofore in making carbon dioxide ice liquid carbon dioxide was expanded into a chamber where it was frozen into snow-like mass and this snow was subjected to very high pressure, ranging between 600 to 850 pounds to the square inch under which pressure it was formed into ice cakes. The translucency of the ice cake depended largely upon the pressure to which the snow was subjected. The object of this invention is to provide a system whereby carbon dioxide liquid may be frozen directly into solid blocks of translucent ice.

It is a well-known fact that carbon dioxide solidifies at a temperature of —70° F. under a pressure of 60.4 pounds per square inch. This point is called the triple point of the compound. Theoretically, at or below this pressure liquid carbon dioxide if passed through a pressure reducing valve will be changed into the solid form. If the pressure beyond the reducing valve is atmospheric pressure a certain quantity of snow will be formed having a temperature of —107° F. It will therefore be seen that the snow at the latter low temperature may be used to cool carbon dioxide under the 60.4 pounds pressure mentioned above or at higher pressures, while this carbon dioxide is still in a liquid form and may freeze it by reducing the liquid to a temperature at or below —70° F. It is this fact that furnishes the basis for the process described in this application.

To further illustrate the idea involved in the invention if we take 7 pounds of carbon dioxide snow manufactured at a near atmospheric pressure the temperature of this snow would be —107° F. Suppose then we sub-cool this snow some 11.7 B. t. u. per pound below the triple point of —70° F. Since the heat of fusion of carbon dioxide is 78.8 B. t. u. per pound we can impregnate 7 pounds of snow with one pound of carbon dioxide liquid at —70° F. The snow then would assume the character of a water soaked snow ball. This wet carbon dioxide snow may then be subjected to a high pressure either in a press or by means of high gas pressure on the surface so that it will be compacted into a dense block of ice.

Broadly stated then the method consists of forming a mass of carbon dioxide snow, saturating this snow with cold carbon dioxide liquid under high pressure and then subjecting the mass of wet snow to a freezing temperature.

One form of apparatus for carrying out the above named process is shown in the drawings and will now be described.

Referring to the accompanying drawings, which are made a part hereof and on which similar reference characters indicate similar parts, Figure 1 is a diagrammatic view of my ice making system, and Figure 2 is a vertical section of an enlarged detail view showing the snow and ice making chambers. In the drawings 10 indicates a chamber having a nozzle 11 projected into it, the nozzle 11 being connected to a source of carbon dioxide liquid under pressure, passage of the liquid into the chamber 10 being controlled by a valve 12. An outlet port 13 is connected to the suction side of a compressor not shown to draw off any carbon dioxide gas which may form within the chamber 10. A cut-off valve 55 is placed in outlet pipe 13. Surrounding the chamber 10 and having its walls spaced therefrom is a second chamber 14. This chamber also has a nozzle 15 projecting therein. This nozzle likewise is connected to a source of cold liquid carbon dioxide under pressure, passage of the carbon dioxide into the chamber 14 being controlled by a manually operable valve 16. An outlet pipe 17 has a connection 18 to which the suction line of a compressor, not shown but forming a part of the snow making system, is connected.

Preferably a screen or sieve 19 is positioned within the pipe 17 to prevent any frozen carbon dioxide from entering the suction line through 18. If desired a connection may be made at 20 to a source of warm gas for thawing out the screen 19 in pipe 17 in case this becomes filled with frozen carbon dioxide. The chambers 10 and 14 are preferably held between headers 21 and 22 by means of bolts 23 so as to provide a gas tight connection between the chambers and the headers. The lower header 22 has an opening 24 which is closed by a plate 25 on the upper end of a piston rod 26. The plate 24 may preferably seat against a ring plate 27 which is held to the plate 22 by means of bolts or screws 28. On the lower end of rod 26 is a piston 29 which operates in a cylinder 30, the cylinder 30 having flanges 31 which are secured by means of bolts 32 to flanges 33 on the lower portion of a frame or support 34 which may be formed integral with the header 22. The cylinder 30 forms a motor for operating the piston 29 to hold the plate 25 in contact with the plate 27 to close the lower end of the chamber 10. The piston 29 is operated by means shown diagrammatically in Figure 1. This means consists of a low pressure pump 35 and a high pressure pump 36. A pipe 37 leads from a brine tank 38 to the suction side of the pump 35. Pump 35 delivers through a discharge line 39 into chamber 40. From the chamber 40, a line 41 leads through a valve 42 to a line 43 which is connected to the cylinder 30 beneath the piston 29. High pressure pump 36 likewise has a suction line 44 and a discharge line 45 which delivers into a chamber 46. From the chamber 46 line 47 leads to the valve 42 through which fluid is delivered to the line 43. Pressure relief valves 48 and 49 lead from the discharge lines 39 and 45 respectively to the brine tank 38. When the valve 42 is in the position shown in Figure 1 passage 50 connects line 41 with line 43 from the low pressure pump 35 to the cylinder 30 beneath the piston 29 to move the piston forward to position the plate 25 so as to close the lower chamber 10. When the valve 42 is rotated so as to connect line 47 and line 43 through the passage 50 then the high pressure pump 36 has its discharge line connected with cylinder 30 so that the piston 29 will be subjected to pressure sufficiently high to hold the plate 25 so as to close the lower end of the chamber 10 when the inside of this latter chamber is subjected to high pressure. When it is desired to lower the piston 29 valve 42 is rotated so as to shut off both of lines 41 and 47 from line 43 and valve 51 is open to connect the cylinder 30 through the discharge line 52 with the brine tank 38.

In carrying out the objects of the invention I proceed to practice a method somewhat similar to that of making a water soaked snow ball. It is well known that an ice ball may be made by making a snow ball and dipping the ball in water or any other wet snow and squeezing it so as to compact the snow particles into an ice ball.

I propose, by means of the apparatus just described, to make solid carbon dioxide ice by first making carbon dioxide snow and then soaking this snow with cold liquid carbon dioxide under high pressure so that the snow will be thoroughly wet through and through and then I propose to subject the wet snow to a pressure sufficiently high to thoroughly compact it and then subject the compact mass to a very low temperature at which the snow-liquid will be frozen into a block of ice.

The method just stated may be carried out by the apparatus just described in the following way:

The valve 12 is opened so that carbon dioxide under pressure is sprayed through the nozzle 11 into the chamber 10 where it expands into snow. The chamber 10 is then put under pressure and liquid carbon dioxide under pressure is delivered into the chamber 10. The chamber 10 is kept under high pressure so that the snow in the chamber 10 is thoroughly impregnated with cold liquid carbon dioxide. Now, as previously stated, it is well-known that liquid carbon dioxide will freeze at a temperature of $-70°$ F. when under a pressure of about 60.4 pounds gauge. Furthermore, carbon dioxide will freeze regardless of the pressure at the proper temperature. For instance, if subjected to a pressure of 1000 pounds, it will freeze into a solid at a definite temperature. With the mixture of liquid snow carbon dioxide in the chamber at a temperature approximately $-70°$ F., I reduce the temperature surrounding the chamber 10 so as to reduce the temperature of the mixture of snow and liquid carbon dioxide. I reduce the temperature surrounding the chamber by means of carbon dioxide snow which I form in the chamber 14 surrounding the chamber 10. In order to form this snow, carbon dioxide liquid under pressure is sprayed through the nozzle 15 into the chamber 14 where it expands and freezes into snow at approximately atmospheric pressure. The snow that it formed at this pressure has a temperature approximately $-107°$ F. This cold carbon dioxide snow absorbs heat through the walls of the chamber 10 so as to reduce the temperature of the liquid snow mixture in the chamber 10 below that at which this snow will freeze into ice at the pressure of 60.4 pounds gauge to which it is subjected. Any unfrozen carbon dioxide entering the chamber 14 is drawn off through the suction line 18 to a compressor forming a part of the snow making system. When the block of carbon dioxide ice has become frozen in the chamber 10 the piston 29 is lowered so that the plate 25 is removed from the lower end of the chamber 10 and the block of carbon dioxde ice is removed from this plate.

Instead of spraying the carbon dioxide into the chamber 10 I may run it in under pressure. The pressure may then be relieved in the chamber 10 so that snow will be formed in this chamber. Other liquid is then delivered into the mass of snow and the whole put under a pressure of about 60.4 pounds gauge. Carbon dioxide is then expanded into the chamber 14 to form snow in this chamber, the snow in this chamber being at atmospheric pressure will have a temperature of approximately $-107°$ F. The temperature of the snow under pressure in the chamber 10 will be approximately $-70°$ F. The cooled jacket of carbon dioxide snow in the chamber 14 surrounding the chamber 10 will extract heat from the carbon dioxide in the chamber 10 and cause this to freeze into a solid cake or block of ice.

Still a further method consists in delivering cold liquid carbon dioxide into the chamber 10 and maintaining a pressure upon it of about 60.4 pounds gauge. With this pressure upon the liquid none of it will automatically flash into snow. Cold carbon dioxide is expanded into the chamber 14 and forms a snow jacket around the chamber 10. This jacket having a temperature of $-107°$ will extract heat from the liquid carbon dioxide in the chamber 10 and cause this liquid to freeze into a block of ice. The frozen product will be a clear translucent ice. The freezing in this latter case is somewhat analogous to freezing ice in cans by using a cold brine solution to abstract heat from the contents of the can.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. The method of making carbon dioxide ice which consists in mixing together carbon dioxide snow and carbon dioxide liquid, subjecting the same to a pressure of approximately 60.4 pounds to the square inch and surrounding the said mixture of snow and liquid with a substance having a temperature below the freezing point of the snow and liquid, substantially as set forth.

2. The method of making carbon dioxide ice which consists in forming a mass of carbon dioxide snow, saturating this snow with cold carbon dioxide liquid under pressure, subjecting the whole mass to a freezing temperature, said freezing temperature being derived from a mass of carbon dioxide snow having a temperature under atmospheric pressure far below the freezing temperature for the liquid carbon dioxide under pressure, substantially as set forth.

3. The method of making translucent carbon dioxide ice which consists in forming a mass of carbon dioxide snow at approximately atmospheric pressure, saturating this snow with carbon dioxide liquid at a temperature of approximately 70 degrees below zero and under a pressure of not less than 60.4 pounds per square inch and surrounding the whole mass with a mass of carbon dioxide snow under atmospheric pressure, substantially as set forth.

4. The method of making carbon dioxide ice which consists in delivering carbon dioxide liquid to a chamber, the liquid being under a pressure in excess of 60.4 pounds per square inch and having a temperature of approximately $-70°$ F., reducing the pressure below 60.4 pounds per square inch whereby a portion of the liquid will flash into snow, then subjecting the whole mass to a pressure in excess of 60.4 pounds per square inch and reducing the temperature below $-70$ degrees F. whereby the mass of liquid and snow will be frozen into a block of ice, substantially as set forth.

5. Means for making carbon dioxide ice which consists of an inner chamber having a nozzle for admitting carbon dioxide liquid thereinto, a surrounding chamber having a nozzle for projecting carbon dioxide liquid thereinto, means for drawing off unfrozen carbon dioxide from the surrounding chamber, the snow in the surrounding chamber serving to freeze the combined snow and liquid in the inner chamber, and a plunger movable to close an end of the inner chamber but operable to be withdrawn to permit the frozen block of carbon dioxide ice to be removed from the inner chamber, substantially as set forth.

6. The method of making carbon dioxide ice which consists in delivering cold liquid carbon dioxide into a chamber to form snow therein, delivering cold liquid carbon dioxide into the chamber to form a mixture of snow and liquid, subjecting the mixture to a pressure of approximately seventy pounds to the square inch, surrounding the chamber with snow formed from expanded carbon dioxide to absorb heat from the mixture of snow and liquid within the chamber to reduce the temperature within the chamber to the freezing point of the liquid therein.

FRANK R. ZUMBRO.